United States Patent
Nakatsugawa

(10) Patent No.: US 6,195,363 B1
(45) Date of Patent: Feb. 27, 2001

(54) TRANSMISSION RIGHT MANAGING METHOD AND COMMUNICATION SYSTEM

(75) Inventor: Yoshinori Nakatsugawa, Susono (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/092,998

(22) Filed: Jun. 8, 1998

(30) Foreign Application Priority Data

Jun. 11, 1997 (JP) .................................. 9-154008

(51) Int. Cl.$^7$ .................................. H04L 12/403
(52) U.S. Cl. .................................. 370/455; 370/475
(58) Field of Search .................. 370/400, 410, 370/422, 423, 424, 425, 426, 445, 447, 449, 450, 451, 452, 453, 455, 457, 461, 462, 474, 475, 392, 393; 340/825.06, 825.07, 825.08

(56) References Cited

U.S. PATENT DOCUMENTS

| | | | |
|---|---|---|---|
| Re. 31,852 | * 3/1985 | Soderblom | 370/424 |
| 4,667,193 | * 5/1987 | Cotie et al. | 340/825.08 |
| 5,010,329 | * 4/1991 | Nagakura | 340/825.8 |
| 5,130,983 | * 7/1992 | Heffner, III | 370/449 |
| 5,457,689 | * 10/1995 | Marvit et al. | 370/449 |

FOREIGN PATENT DOCUMENTS 8-149148   6/1996   (JP) .

* cited by examiner

*Primary Examiner*—Wellington Chin
*Assistant Examiner*—Kwang B. Yao
(74) *Attorney, Agent, or Firm*—Oblon, Spivak, McClelland, Maier & Neustadt, P.C.

(57) ABSTRACT

In a system where transmission right communication device 1-2 in plural communication devices 1-1 through 1-16 connected with a bus 3 transmits data to transmission requesting communication devices 1-1 and 1-3 through 1-16, the transmission right communication device transmits a collecting command, and when a transmission request is made, the respective transmission requesting communication devices add their self addresses to the collecting command so as to transmit the collecting command, and the transmission right communication device receives the collecting command to which the self addresses of all the transmission requesting communication devices making the transmission request are collectively added.

20 Claims, 10 Drawing Sheets

TRANSMISSION RIGHT MANAGING METHOD AND COMMUNICATION SYSTEM

BACKGROUND OF THE INVENTION

1. Field of the Invention

The present invention relates to a transmission right managing method which easily manages transmission rights of respective communication devices and reduces a communication traffic amount required for the management in a communication system in which plural communication devices are connected with a transmission line and communication is performed among the plural communication devices, and relates to the communication system.

2. Description of the Related Art

In Example 1 of a conventional communication system in which plural nodes (communication devices) are connected with a transmission line and communication is performed among the plural nodes, the respective nodes judge as to whether or not transmission is performed in the transmission line, and when judging that the communication is not performed, the respective nodes start transmission of transmission data.

In addition, in Example 2 of a conventional communication system, the respective nodes request transmission of a specific node, and the specific node which received the transmission request prioritizes the plural transmission requests received by the respective nodes and gives a transmission right only to the node with the highest priority, and the transmission is started from the node to which the transmission right is given.

Further, Example 3 of the communication system adopts the token passing method where when the node obtaining the transmission right completes the transmission or does not need transmission, the transmission right is transferred to the next node.

However, in Example 1 of the communication system, when the transmission is started simultaneously from the plural nodes, transmission data from the respective nodes conflict with each other in the transmission line, so there arises a problem such that a countermeasure should be taken against the conflict in order to prevent the transmission data from being destroyed.

In addition, Example 2 of the communication system requires data used for requesting transmission from the respective nodes to the specific node and for authorization of the transmission from the specific node to the respective nodes. For this reason, a communication traffic amount is increased. Moreover, in the case where a transmission request is transmitted simultaneously from the plural nodes to a specific node, the transmission requests of the respective nodes conflict with each other in the transmission line, so there arises a problem such that a countermeasure should be taken against the conflict in order to receive all the transmission requests.

Further, in Example 3 of the communication system adopting token passing method, since a transmission right is given regardless of the priority order of the transmission, there arises a problem such that transmission data which should be transmitted very urgently cannot be transmitted quickly.

SUMMARY OF THE INVENTION

It is an object of the present invention to provide a transmission right managing method and communication system which manage transmission rights of respective communication devices easily and reduce a communication traffic amount without the conflict of data.

In order to solve the above problems, the present invention has the following constitution. A first aspect of the present invention provides a transmission right managing method in which communication is performed between plural communication devices connected with a data transmission line and a transmission right communication device with a transmission right in the plural communication devices transmits data to one or more transmission requesting communication devices which request the transmission right in the remaining communication devices, said method comprising the steps of: transmitting a collecting command from the transmission right communication to the transmission request communication devices; adding self addresses to the collecting command in the transmission requesting communication devices, when a transmission request is made, to transmit the collecting command from the transmission requesting communication devices; and receiving in the transmission right communication device the collecting command to which self addresses of all the transmission requesting communication devices making the transmission request were added collectively.

According to the present invention, when the transmission request is made, the transmission requesting communication devices add their self addresses to the collecting command from the transmission right communication device so as to transmit the collecting command, and the transmission right communication device receives the collecting command to which the self addresses of all the transmission requesting communication devices making the transmission request are added collectively.

Namely, all pieces of report information of the transmission requesting communication devices making the transmission request are added collectively to the collecting command, and the transmission right communication device collects the collecting command, so the collecting command can be collected at a small communication traffic amount without conflict of data.

According to a second aspect of the present invention, when the transmission request is made, the transmission requesting communication devices set transmission flags, and only the transmission requesting communication devices which set the transmission flags receive the collecting command. As a result, the collecting time can be shortened.

According to a third aspect of the present invention, report information representing the degree of urgency of a command for one or more transmission requesting functional equipments connected with the transmission requesting communication devices making the transmission request is added to the collecting command. According to a fourth aspect of the present invention, the self addresses are added to the collecting command in an area which is divided per the degree of urgency of the command. According to a fifth aspect of the present invention, requesting contents for the transmission requesting communication devices making the transmission request are added to the collecting command.

According to a sixth aspect of the present invention, the transmission right communication device determines the transmission requesting communication devices to which the transmission right should be given, based on the collected address. As a result, the transmission right of the transmission requesting communication devices can be managed easily, and the invention can cope with an emergency quickly.

According to a seventh aspect of the present invention, the transmission right communication device determines the transmission requesting functional devices to which the transmission right should be given connected with the transmission requesting communication devices, based on the collected addresses. As a result, the transmission right of the transmission requesting functional equipments can be managed easily, and the invention can cope with an emergency quickly.

According to an eighth aspect of the present invention, the transmission right communication device determines the transmission requesting functional equipments to which the transmission right should be given, based on the degree of urgency of the command and priority of the self addresses of the transmission requesting functional equipments. As a result, the transmission right of the transmission requesting functional equipments can be managed easily and the invention can cope with an emergency quickly.

According to a ninth aspect of the present invention, the transmission requesting communication devices add adding information to the received and collecting command successively in a prescribed arrangement. According to a tenth aspect of the present invention, the adding information collected by the transmission right communication device is transmitted to a managing device for managing a path of a communication system. As a result, since the managing device manages the path based on the adding information, the path can be managed easily.

An eleventh aspect of the present invention provides a communication system comprising plural communication devices connected with a data transmission line in which communication is performed between the plural communication devices, and a communication device with transmission right in the plural communication devices transmits data to one or more transmission requesting communication devices requesting transmission right in the remaining communication devices, wherein the transmission right communication device transmits a collecting command to the transmission requesting communication devices, when a transmission request is made, the transmission requesting communication devices add self addresses to the collecting command so as to transmit the collecting command, and the transmission right communication device receives the collecting command to which the self addresses of all the transmission requesting communication devices making the transmission request were added collectively.

With this configuration, the same effects are achieved as the transmission right managing method.

DETAILED DESCRIPTION OF THE PREFERRED EMBODIMENTS

The following describes in detail embodiments of a transmission right managing method and communication system of the present invention on reference to the drawings.

[First Embodiment]

Figure 1:
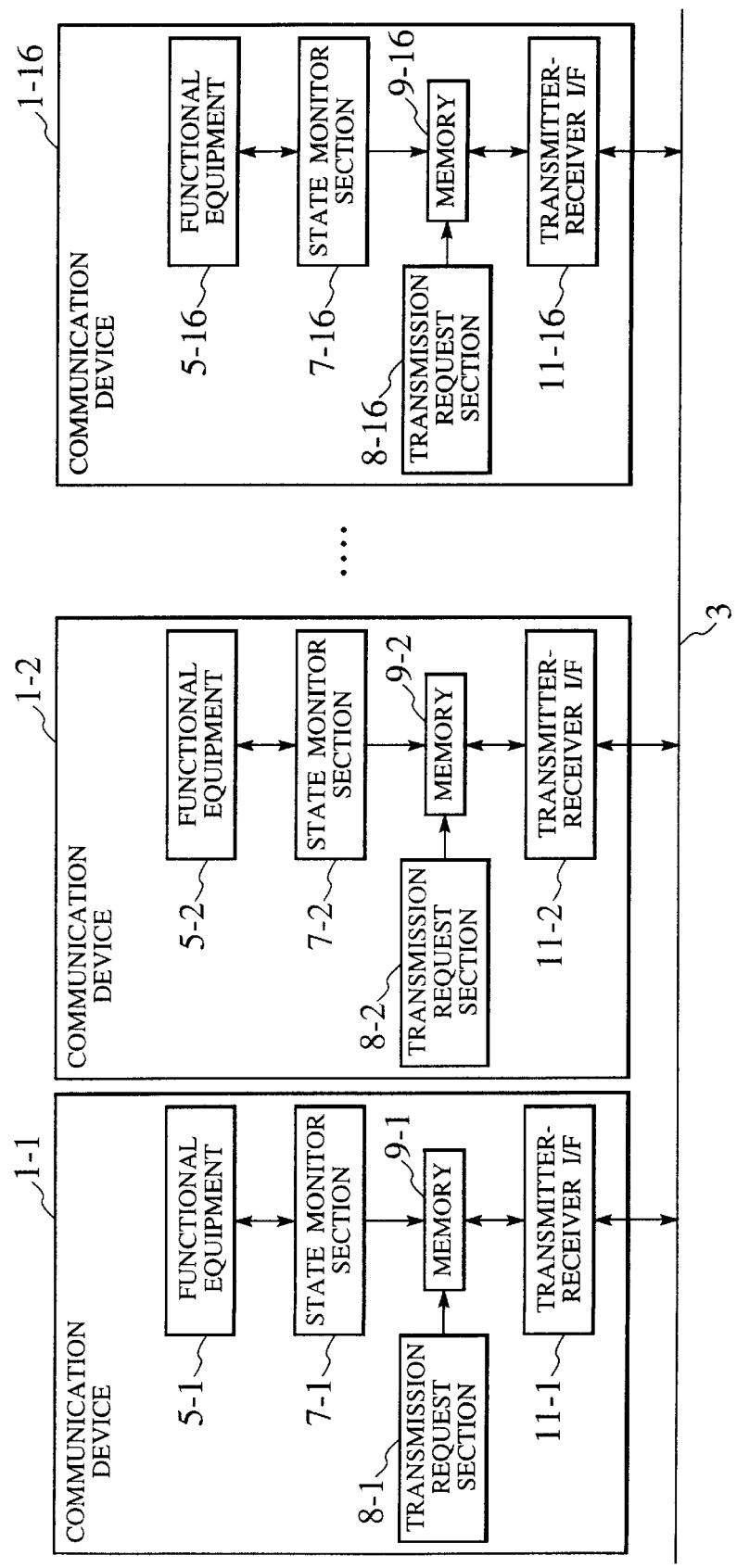
FIG. 1 is a constitutional drawing of a communication system according to a first embodiment of the present invention.

FIG. 1 shows a constitutional drawing of a communication system according to the first embodiment of the present invention. The communication system is constituted so that a plurality of communication devices 1-1 and 1-3 through 1-16 between which data are communicated and a system control unit (hereinafter, referred to as SCU) 1-2 which is a prescribed communication device for controlling these communication devices are connected with one bus 3.

The SCU 1-2 and the respective communication devices 1-1 and 1-3 through 1-16 are constituted so as to respectively include functional equipments 5-1 through 5-16, state monitor sections 7-1 through 7-16, transmission request sections 8-1 through 8-16, memories 9-1 through 9-16, and transmitter-receiver interface (transmitter-receiver I/F) 11-1 through 11-16.

The functional equipments 5-1 through 5-16 are, for example, a compact disc (CD), mini disc (MD) and digital video disc or digital versatile disc (DVD), and they have state information such as CD data, MD data and DVD data.

Figure 2:
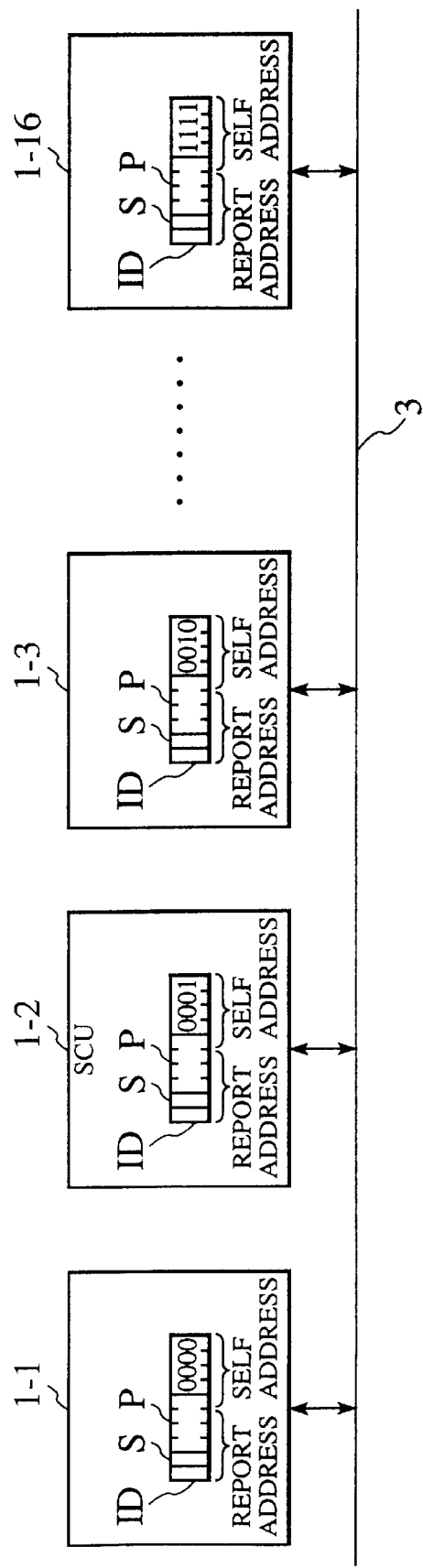
FIG. 2 is a drawing showing a self address and report address set in an address area of a memory of respective communication devices.

As shown in FIG. 2, the memories 9-1 through 9-16 have a self address, and a report address used for receiving collecting command in an address area of the data to be received. Here, the self addresses of the SCU 1-2 and the respective communication devices 1-1 and 1-3 through 1-16 are represented by four bit. For example, the self address of the SCU 1-2 is represented by "0001", and the self address of the communication device 1-16 is represented by "1111".

The report address is composed of an ID flag for discriminating as to whether or not a command includes report request, an S flag showing as to whether or not report and transmission rights are given to the SCU 1-2, and an urgent flag P showing the degree of urgency of the commands of the SCU 1-2 and the respective communication devices 1-1 and 1-3 through 1-16.

Here, the collecting command is used for collecting all the report information of the communication devices where a transmission flag is set other than a transmission source into the transmission source. The S flag and ID flag are reset for "0" in the initial state, and when transmission request exists, they are set for "1", and when the report information is collected by the collecting command, they are reset for "0".

In addition, in the respective communication devices, when the ID flag is "1" and the S flag is "1", data are discriminated as a collecting command. Hereinafter, this collecting command is referred to as a request frame. When the ID flag shows "1" and the S flag shows "0", data are discriminated as being state report and delivery of transmission right to the SCU 1-2. Hereinafter, the state report to the SCU 1-2 is referred to as an answer frame. When the ID flag shows "0" and the S flag shows "1", the data are normal command. The ID flag and S flag may be added to the transmission source address, or they may be added to a command.

The degree of urgency is allocated to each command, and the functional equipment in the communication device to which a transmission right is given is determined by the degree of urgency of the commands. When the degrees of urgency are equal, the functional equipment in the communication device to which a transmission right will be given is determined by priority of the functional equipments. The priority is allocated each functional equipment and determined by the addresses of the functional equipments.

The transmission request sections 8-1 through 8-16 request the communication device having the transmission right representing the right to use the bus 3 to transmit data, and when requesting it to transmit the data, the transmission request sections 8-1 through 8-16 set the S flag and ID flag in the memories 9-1 through 9-16.

The communication device (transmission source) having the current transmission right of the SCU 1-2 and the respective communication devices 1-1 and 1-3 through 1-16 transmits a request frame to the communication device in which the transmission flag was set.

When receiving the request frame from the transmission source, the transmitter-receiver I/Fs 11-1 through 11-16 reset the S flags and ID flags stored in the memories 9-1 through 9-16 and add the report information and self addresses stored in the memories 9-1 through 9-16 to the request frame to transmit it.

The state monitor sections 7-1 through 7-16 monitor as to whether or not the state information of the functional equipments 5-1 through 5-16 is changed, and when the state information is changed, the state monitor sections 7-1 through 7-16 change the state information stored in the memories 9-1 through 9-16.

Figure 4:
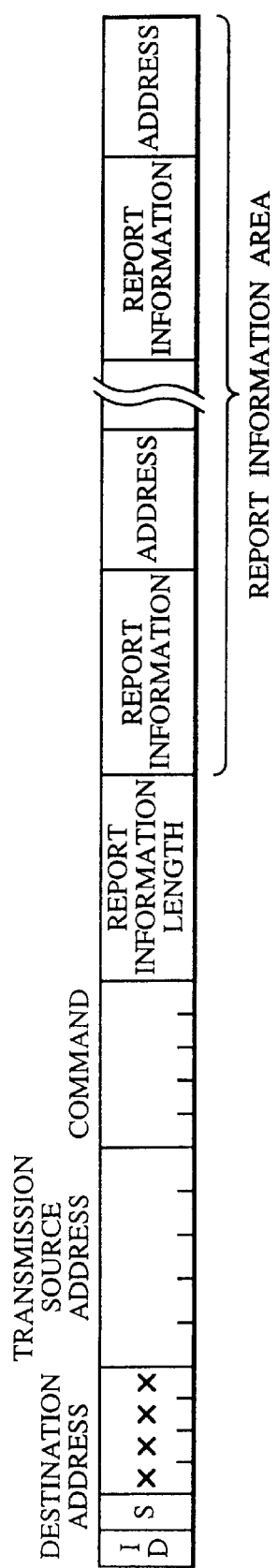
FIG. 4 is a constitutional drawing of request frames and answer frames.

FIG. 4 shows the constitutional drawing of the request frame and answer frame. The request frame and answer frame shown in FIG. 4 are composed of a destination address, transmission source address, command, report information length and report state area. The report information area is composed of a pair of report information composed of report address and a self address, and a plurality of report information areas are provided. The ID flag and S flag are added to the destination address. As for the report information length, each report information has a prescribed fixed length. Here, the report information length may be a variable length.

In addition, when requesting transmission, the SCU 1-2 and the respective communication devices receive a request frame in which the ID flag is "1" and S flag is "1". When the request frames, which are collected from all the communication devices where the S flag and ID flag are set, are returned to the transmission source, the transmission source determines the order of priority for the report information and rearranges the order of the report information so as to give the transmission right to the functional equipment in the communication device having the highest priority.

At this time, the transmission source adds the collected report information to the answer frame where the ID flag is "1" and S flag is "0" and transmits this answer frame to the functional equipment in the communication device having the highest priority and the SCU 1-2. The SCU 1-2 receives the answer frame where the ID flag is "1" and S flag is "0" from the transmission source and confirms the functional equipment in the communication device having the highest priority and determines the report information.

Figure 3:
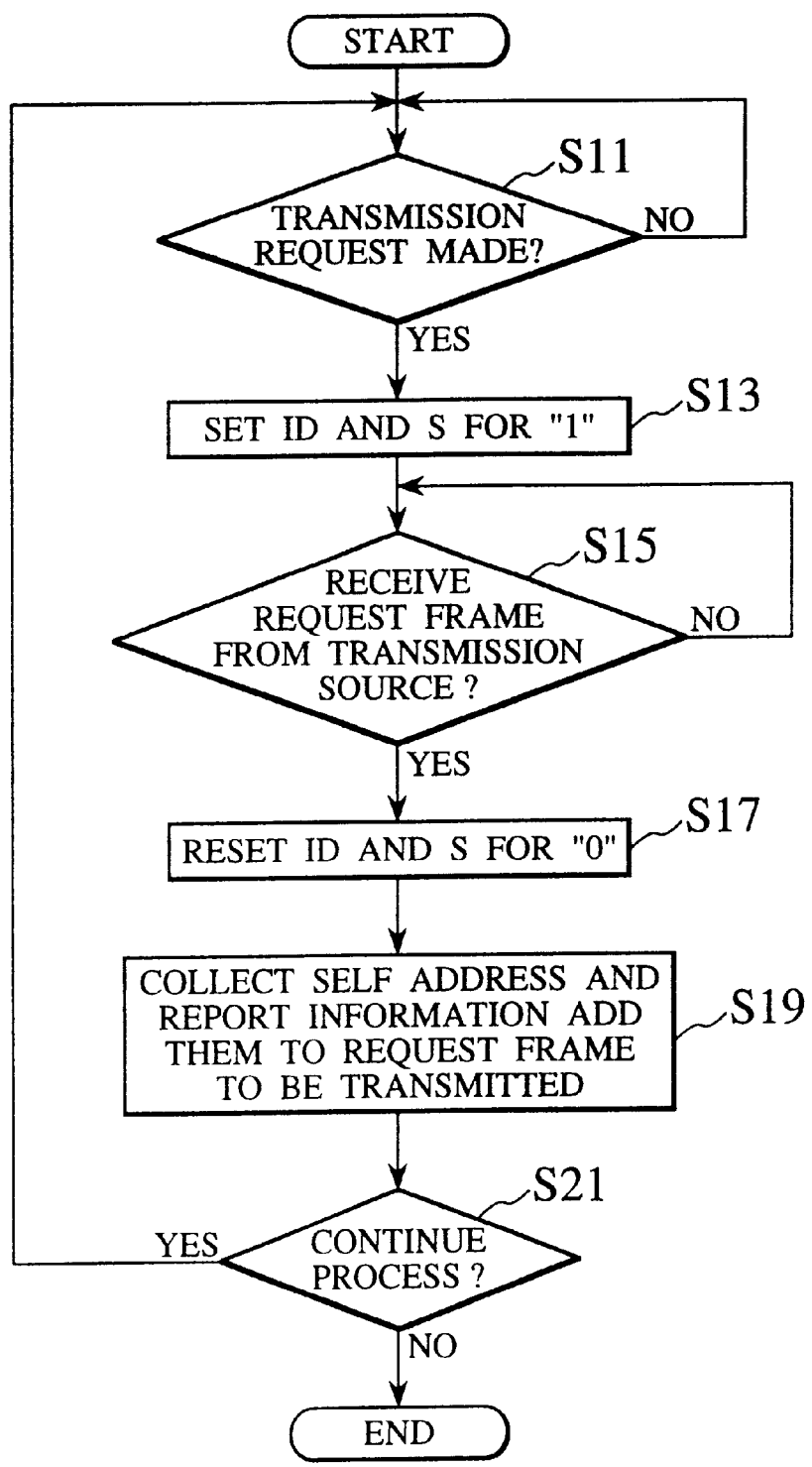
FIG. 3 is a flow chart showing collection of request frames including report information.
Figure 5:
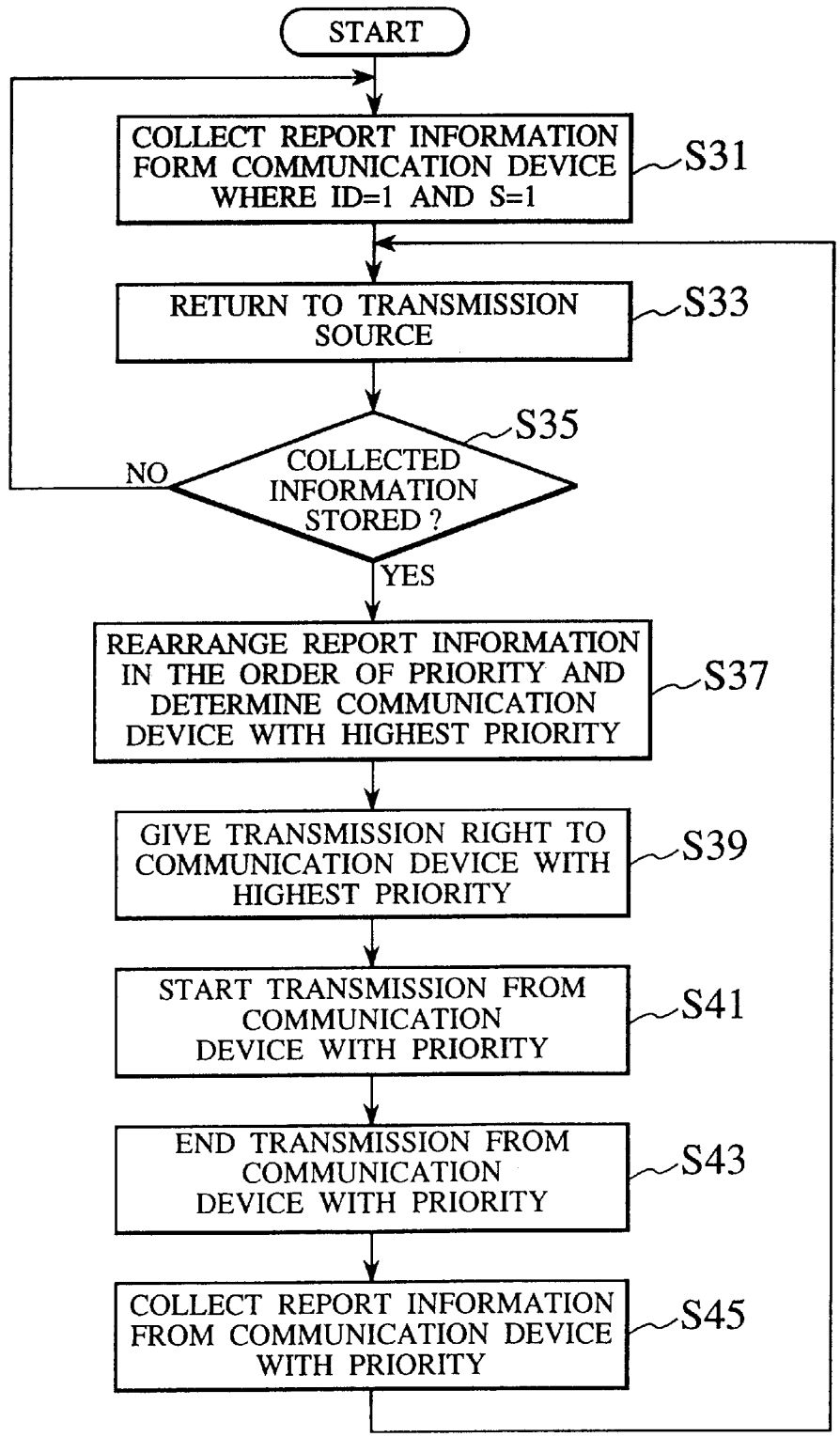
FIG. 5 is a flow chart showing the transmission right managing method realized by the communication system according to the first embodiment.

The following describes the transmission right managing method according to the first embodiment realized by the communication system having the aforementioned constitution on reference to the flow charts of FIGS. 3 and 5. In this communication system, when there is no transmission right, namely, no transmission request, a transmission right is given to the SCU 1-2 as a prescribed communication device which is predetermined.

First, a judgment is made as to whether or not the transmission request sections 8-1 and 8-3 through 8-16 in the communication devices 1-1 and 1-3 through 1-16 make a transmission request (S11), and when the transmission request sections 8-1 and 8-3 through 8-16 make the transmission request, they set the S flag and ID flag in the memories 8-1 and 8-3 through 8-16 for "1" (S13).

Next, when the SCU 1-2 which is the transmission source having the current transmission right transmits the request frame to the communication device where the S flag and ID flag are set, for example, the communication device 1-1, a judgment is made as to whether or not the communication device 1-1 receives the request frame from the SCU 1-2 as the transmission source (S15).

Here, when the ID flag is "1" and S flag is "1", the transmitter-receiver I/F 11-1 resets the ID flag and S flag of the memory 9-1 for "0" (S17) according to the judgment as the request frame.

The transmitter-receiver I/F 11-1 writes the report information and self address in the first information area in the report information areas of request frame so that the report information and self address are not overwritten and transmits the request frame to the communication device 1-3 (S19). Here, a judgment is made as to whether or not the process is continued (S21), and when the process is continued, the sequence returns to S11.

Meanwhile, the transmitter-receiver I/F 11-3 in the communication device 1-3 receives the request frame in which the report information was collected in the communication device 1-1. Also in the communication device 1-3, the process of the flow chart shown in FIG. 3 is performed. In the communication device 1-3 where the S flag and ID flag are set, the process from S11 through S19 is performed. Namely, the transmitter-receiver I/F 11-3 writes the report information and self address in the second information area in the report information areas of the request frame so that the report information and self address are not overwritten and transmits the request frame to the communication device 1-4.

In the same manner, the request frame is transmitted to the communication devices 1-5, 1-6 . . . 1-16 in this order, and in the respective communication devices, the transmitter-receiver I/F writes the report information and self address in the corresponding information area in the report information areas of the request frame so that the report information and self address are not overwritten, and transmits the request frame to the next communication device.

Then, the SCU 1-2 as the transmission source collects the request frames, to which report information of all the communication devices 1-1 and 1-3 through 1-16 where the S flag and ID flag are set for "1", namely, all the communication devices where transmission request was given were added collectively (S31), and the request frame is returned to the transmission source (S33).

Further, the SCU 1-2 judges as to whether or not the report information is stored in the collected request frames (S35), and when the report information is not stored, the sequence returns to S31.

When the report information is stored, the SCU 1-2 rearranges the report information stored in the request frames in the order of priority based on the degree of urgency of the command and the time of transmission request and the degree of urgency of the communication devices so as to determine the communication device having the highest priority (S37).

Here, the report information is collected so that the request frame is padded with the report information successively from its left part, so the report information on the left part is collected earlier. As for the order of priority, the communication device to which a more urgent transmission request is given has higher priority, and when the degrees of urgency are equal, the communication device to which transmission request is given earlier has higher priority. Moreover, the degree of urgency is preset in each command. Moreover, the degrees of urgency are equal, the report information is rearranged in the order of the functional equipments having higher priority.

Here, the report information which was collected by circulating the request frames shall be collected at the same time. The SCU 1-2 rearranges the report information in the order of priority, and transmits transmission right and the collected report information to the functional equipment in the communication device having the highest priority (S39). In this case, an answer frame where the ID flag is 1 and S flag is 0 is transmitted to the communication device to which the transmission right was given and SCU 1-2. Moreover, the SCU 1-2 receives the answer frame, and confirms the functional equipment in the communication device having the highest priority and obtains the report information therefrom. The functional equipment 5-1 in the communication device which obtained the transmission right, for example, in the communication device 1-1 starts the transmission of data (S41).

Further, when the functional equipment 5-1 in the communication device having priority, namely, the communication device 1-1 ends the transmission of data (S43), the prioritized communication device 1-1 transmits a request frame and collects a request frame from the communication device where the S flag and ID flag were set (S45), and the sequence returns to S33.

In such a manner, when the respective communication devices make transmission request, the S flag and ID flag are set. Moreover, a request frame is transmitted from the transmission source having current transmission right to the communication device where the S flag and ID flag are set, and in the communication device which received the request frame, the transmission flag and ID flag in the self memory are reset, and the self address and report information are added to the request frame so that the request frame is transmitted.

Namely, when the report information in all the communication devices which make transmission request is collected by circulating therearound, the report information can be collected with small communication traffic amount without conflict of data.

Further, when only the communication device where the S flag and ID flag are set for "1" receives the request frame, the collecting time can be reduced compared with the case where the report information is collected from all the communication devices.

In addition, after the report information is collected by circulating the communication devices, the order of priority of the report information is determined, and the transmission right is given to the functional equipment in the communication device having the highest priority. As a result, since the data are transmitted from the functional equipment in the communication device having the highest priority, the transmission rights of the respective communication devices can be managed easily.

For example, in the communication system adopting the token passing method where the transmission right is transferred to next communication devices successively, data with high priority could not be transmitted quickly, but according to the first embodiment, since the communication device, which has the report information with the most highest degree of urgency, can obtain the transmission right first, particularly in an emergency, data can be transmitted quickly.

In addition, since the report information of all the communication devices can be stored in the request frame and answer frame, in the case where the respective communication devices make transmission requests of the same report information once, it is not necessary for the communication devices to make transmission request of the same report information. For this reason, the procedure of the transmission requests by the respective communication devices and the configuration of the circuits can be simple.

Here, the first embodiment described the bus-type communication form, but the present invention is applicable to, for example, a ring-type communication form in which a plurality of communication devices are connected in a ring form by a transmission line.

[Second Embodiment]

Figure 6:
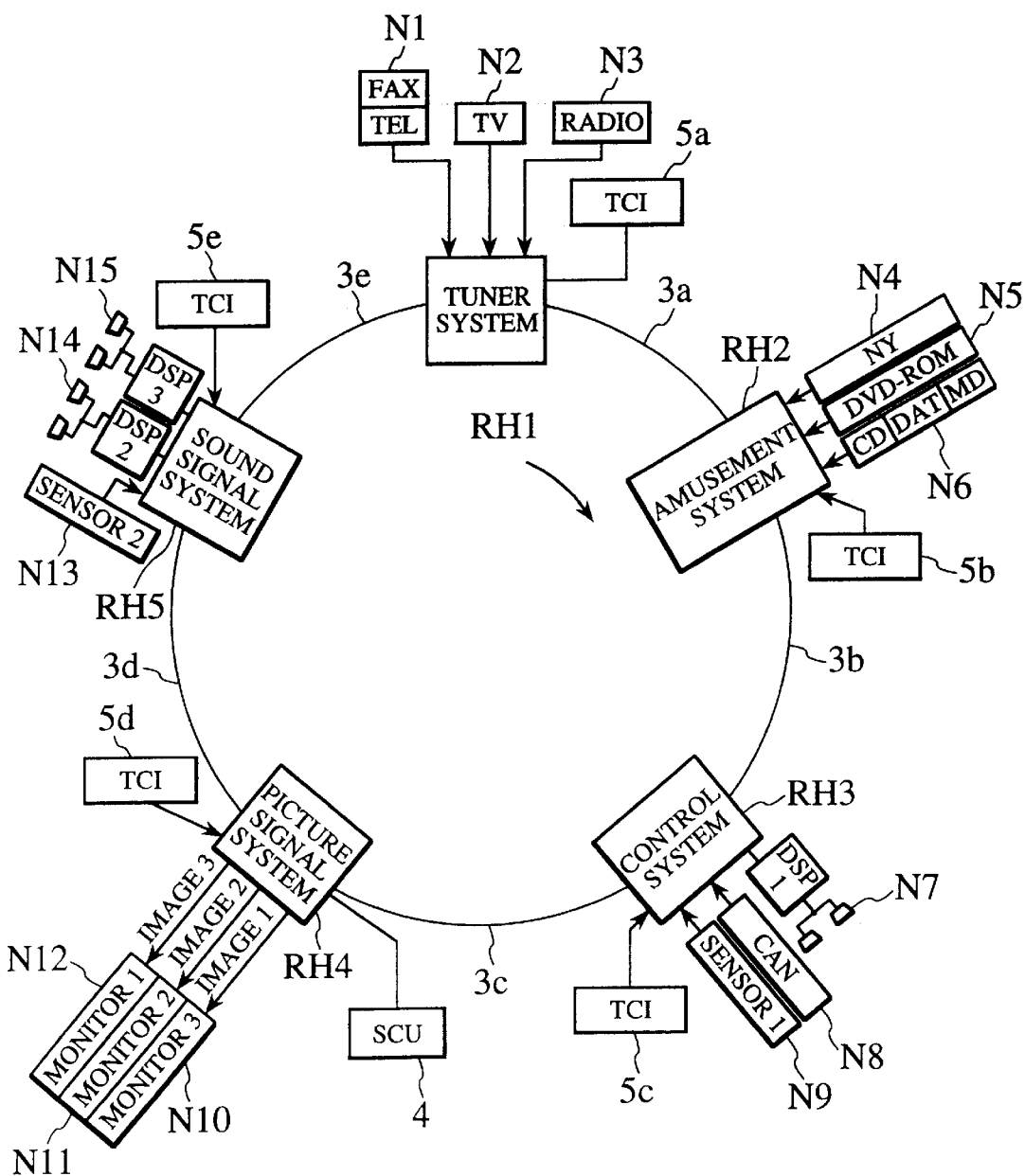
FIG. 6 is a constitutional drawing of the communication system according to a second embodiment.

The following describes the communication system according to the second embodiment of the present invention. FIG. 6 shows the constitution of the communication system of the second embodiment. In this communication system, the first communication device (route hub) RH1 through the fifth communication device RH5 are connected by data transmission lines 3a through 3e in a ring form, and communication is performed between the communication devices.

In the respective communication devices RH1 through RH5, when the destination of received data is a communication device or a functional equipment connected therewith, the communication device captures the data, and when the destination of received data is a destination other than the communication device or its functional equipment, the communication device transmits the data directly to the data transmission line, and when there are data to be transmitted, it transmits them to the data transmission line.

One or more functional equipments N1 through N15 are connected respectively to the plural communication devices RH, and they are arranged so that data are exchangeable between the communication devices RH, between the functional equipments N or between the functional equipments N and the communication devices RH through the data transmission lines 3a through 3e.

The first communication device RH1 is a tuner, and this tuner receives a radio wave of TV or radio broadcasting, etc. from portable telephone (TEL)/facsimile (FAX) as the first functional equipment N1, TV as the second functional equipment N2 and radio receiver as the third functional equipment N3.

The second communication device RH2 is an amusement system, to this amusement system, an audio signal and video signal, information about a traffic jam, etc. are provided from a navigation unit (NV) as the fourth functional equipment N4, a digital video disc or digital versatile disc (DVD-ROM device) as the fifth functional equipment N5 and a compact disc (CD)/digital audio taperecorder (DAT)/mini disc (MD) as the sixth functional equipment N6.

The third communication device RH3 is a control system, and to this control system, control information is provided from a speaker as the seventh functional equipment N7, a controller area network (CAN) as the eighth functional equipment N8 and a sensor 1 as the ninth functional equipment N9.

The fourth communication device RH4 is a picture signal system, and this picture signal system provides a picture signal to a monitor 1 as the tenth functional equipment N10 displaying an image 1, a monitor 2 as the eleventh functional equipment 11 displaying an image 2 and a monitor 3 as the twelfth functional equipment N12 displaying an image 3.

In addition, the fourth communication device RH4 is connected with a system control unit (SCU) 4 which controls a path of the communication system. Here, as the communication system, besides a ring-type one, bus-type and star-type communication systems can be adopted.

The fifth communication device RH5 is a sound signal system, and this sound signal system provides a sound signal to a sensor 2 as the thirteenth functional equipment N13, a speaker as the fourteenth functional equipment N14 containing a digital signal processor (DSP) and a speaker as the fifteenth functional equipment N15.

In addition, since inherent addresses are set respectively in the plural communication devices RH and functional equipments N, the plural communication devices RH are connected respectively with terminal connected information setting devices (TCI) 5a through 5e composed of a microcomputer, for example.

The respective terminal connected information setting devices (TCI) 5a through 5e are arranged so as to store terminal connected information including all the device addresses of the communication devices RH composing the communication system and including set values of the terminal addresses of all the functional equipments N connected with the communication devices RH, and the terminal connected information stored in the terminal connected information setting devices (TCI) 5a through 5e is supplied to the respective communication devices RH.

Figure 7:
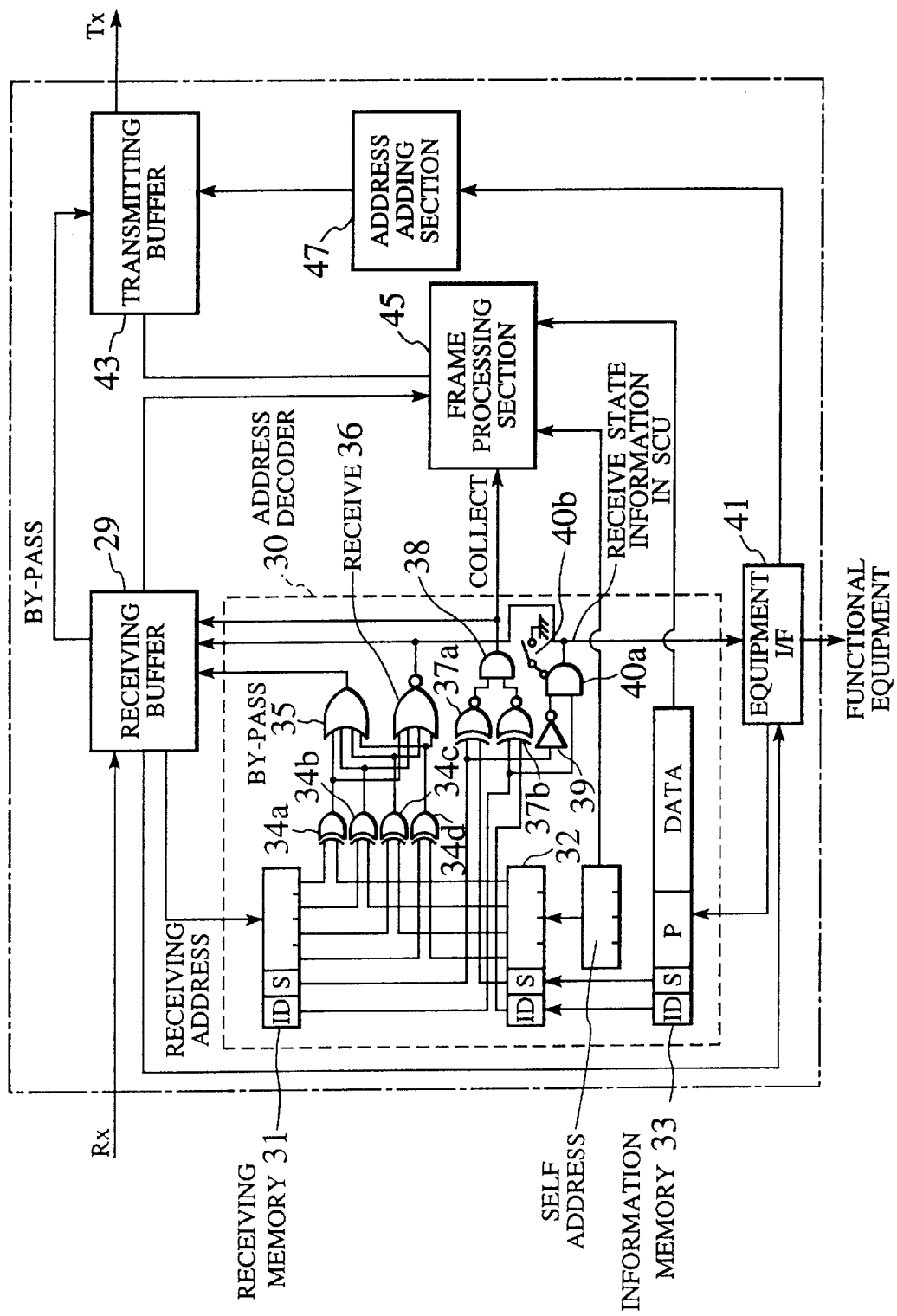
FIG. 7 is a constitutional block diagram of a main section of the respective communication devices.

FIG. 7 shows a constitutional block diagram of the main section of the respective communication devices. The respective communication devices RH1 through RH5 include a receiving buffer 29 for storing received data received from a network, an address decoder 30 for decoding an address of the received data stored in the receiving buffer 29, an equipment interface (equipment I/F) 41 connected with the functional equipments, and a transmitting buffer 43 for storing transmission data to be transmitted to the network.

In addition, the respective communication devices RH1 through RH5 include a frame processing section 45 for when receiving a request frame or answer frame from the network, performing a signal process on the frames, and an address adding section 47 for adding a transmission source address and destination address to the transmission data.

The address decoder 30 includes a receiving memory 31 for storing an address area of the received data from the network, a transmission memory 32 for storing a state of the ID flag, a state of the S flag representing transmission request and a self address, and an information memory 33 for storing a state of the ID flag, a state of the S flag representing transmission request, the degree of urgency P of a command and report information (data).

The address decoder 30 includes EX-OR circuits 34a through 34d for obtaining exclusive OR of an address of the receiving memory 31 and a self address of the transmission memory 32, an OR circuit 35 for obtaining logical OR of the EX-OR circuits 34a through 34d and outputting its output to the receiving buffer 29 so as to by-pass the received data, and an OR circuit 36 for obtaining logical OR of the EX-OR circuits 34a through 34d and outputting its inverted output to the receiving buffer 29 and equipment I/F 41 so as to receive the received data.

In addition, the address decoder 30 includes a logical circuit 37a for obtaining exclusive OR of the S flag of the receiving memory 31 and the S flag of the transmission memory 32 and obtaining the inverted output of its output, a logical circuit 37b for obtaining exclusive OR of the ID flag of the receiving memory 31 and the ID flag of the transmission memory 32 and obtaining the inverted output of its output, and an AND circuit 38 for obtaining AND of the logical circuits 37a and 37b and outputting its output to the receiving buffer 29 and frame processing section 45 so as to collect the data.

In addition, the address decoder 30 includes an inverting buffer 39 for inverting the S flag of the receiving memory 31, an AND circuit 40a for obtaining AND of the output of the inverting buffer 39 and the ID flag of the receiving memory 31 and outputting its output to the receiving buffer 29 and equipment I/F 41, and a switch 40b. The address decoder 30 receives state report in the SCU 4.

The equipment I/F 41 transmits the received data in the receiving buffer 29 to the functional equipment, transmits the transmission data to be transmitted from the functional equipment to the network to the transmitting buffer 43 via the address adding section 47, and stores the degree of urgency P according to urgency of the data received from the functional equipment in the information memory 33. The degree of urgency P is allocated to each command. The functional equipment to which transmission right is given is determined by the degree of urgency of the commands. In the case where the respective degrees of urgency are equal, the functional equipment to which transmission right is given is determined by the degree of priority of the functional equipments. The degree of priority is allocated to the respective functional equipments, and it is determined by the addresses of the functional equipments.

Figure 8:
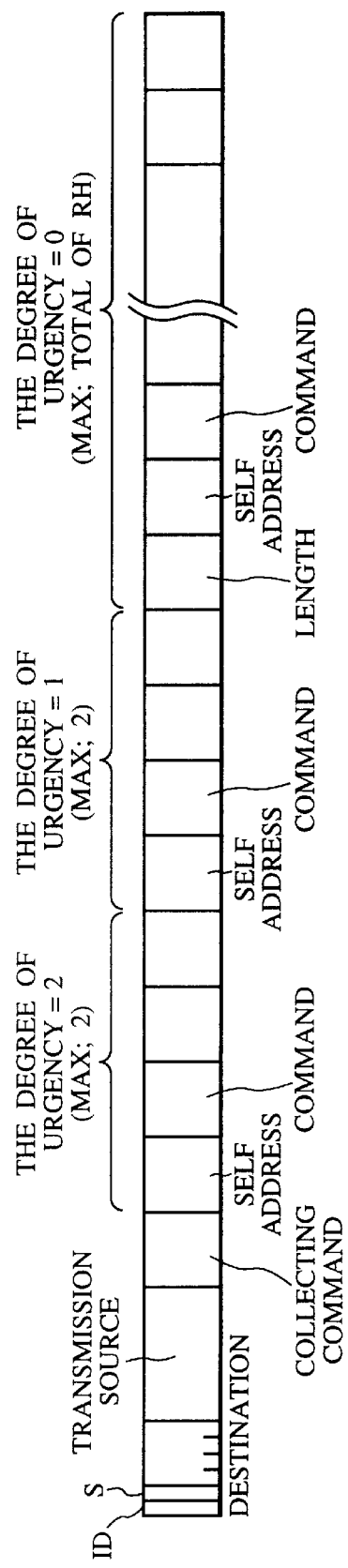
FIG. 8 is a drawing showing a constitution example 1 of the request frame and answer frame.

FIG. 8 shows the arrangement example 1 of the request frame and answer frame according to the second embodiment. In the arrangement example 1 of the request frame and answer frame shown in FIG. 8, two address storage areas are fixed respectively in the degree of urgency 2 and the degree of urgency 1. The request frame and answer frame are arranged so as to have destination addresses including the ID flag and S flag, transmission source addresses, collecting commands, the degree of urgency 2, the degree of urgency 1 and the degree of urgency 0. The respective degrees of urgency are composed of a self address and command. As for setting and resetting of the ID flag and S flag, the description is the same as that in the first embodiment, so the description thereof is omitted.

The degree of urgency 2 represents that data have the highest priority, and the data have maximumly, for example, two pieces of priority order information of transmission right composed of a pair of a self address and command. The degree of urgency 1 represents that the data have priority, and the data have maximumly, for example, two pieces of priority order information of transmission right composed of a pair of a self address and command.

The degree of urgency 0 represents that data have normal urgency, and the data have maximumly, for example, priority order information of transmission right composed of a pair of a self address and command whose number is the same as a number of the communication devices to be connected with the network. Length of the degree of urgency 0 in each storage area is increased by only one every time one self address and command with fixed length are stored in each storage area. The command includes state report contents or schematic contents, etc. such as a continuous key and instructions. Here, even if there is no command storage area, the basic function is fulfilled.

Figure 9:
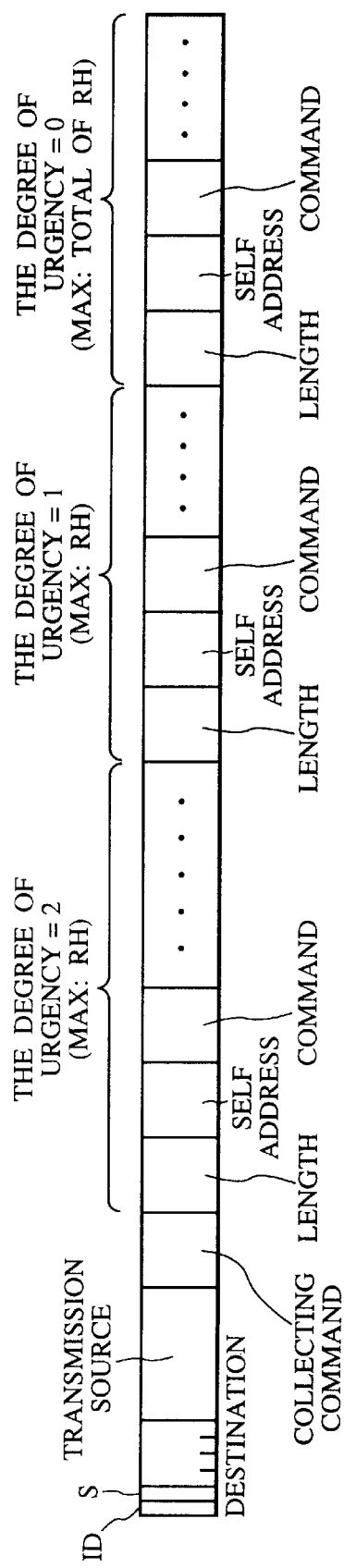
FIG. 9 is a drawing showing a constitution example 2 of the request frames and answer frames.

FIG. 9 shows the arrangement example 2 of the request frame and answer frame according to the second embodiment. In the arrangement example 2 of the request frame and answer frame shown in FIG. 9, a number of the address storage areas is set in each degree of urgency so as to be up to a number of the communication devices. Namely, the request frame and answer frame in the arrangement example 2 are arranged so that the arrangement of the degree of urgency is different from the request frame and answer frame in the arrangement example 1. The respect degrees of urgency 2, 1 and 0 have priority order information of transmission right composed of a pair of a self address and command whose number of pieces is maximumly, for example, the same as a number of the communication devices connected with the network. Length (report information length) in each storage area of the collecting command is increased by only one every time when one self address and command with fixed length are stored in each storage area.

When the communication device or functional equipment generates a transmission request, the ID flag and S flag of the destination area of the request frame and answer frame shown in FIGS. 8 and 9 are set for "1". In this case, the request frame is transmitted to the communication device which received the transmission request from the transmission source.

In the request frame and answer frame, an area to which commands including a self address and report information are added according to the degree of urgency is preset, and in the communication device which received the request frame and answer frame, the self address and command of the communication device or functional equipment are added to the prescribed area of the collecting command so that the collecting command is transmitted.

In addition, when the SCU 4 and respective communication devices request transmission, they receive a request frame in which the ID flag is "1" and S flag is "1". When the request frames, which were collected from all the communication devices in which the transmission flag was set, are returns to the transmission source, the transmission source prioritizes the functional equipments according to the storage contents of the request frame and gives the transmission right to the functional equipment having the highest priority.

As the degree of urgency is higher, the priority becomes higher. When the degrees of urgency are equal, the functional equipment which requests transmission earlier has higher priority. The data which are requested to be transmitted earlier are stored in the left side of the request frame.

At this time, the transmission source sets the ID flag for "1" and S flag for "0", and adds the collected state report information so as to transmit the data to the functional equipment having the highest priority. Moreover, the SCU 4 receives an answer frame in which the ID flag is "1" and S flag is "0" from the transmission source, and confirms the functional equipment having the highest priority and confirms the state report.

Figure 10:
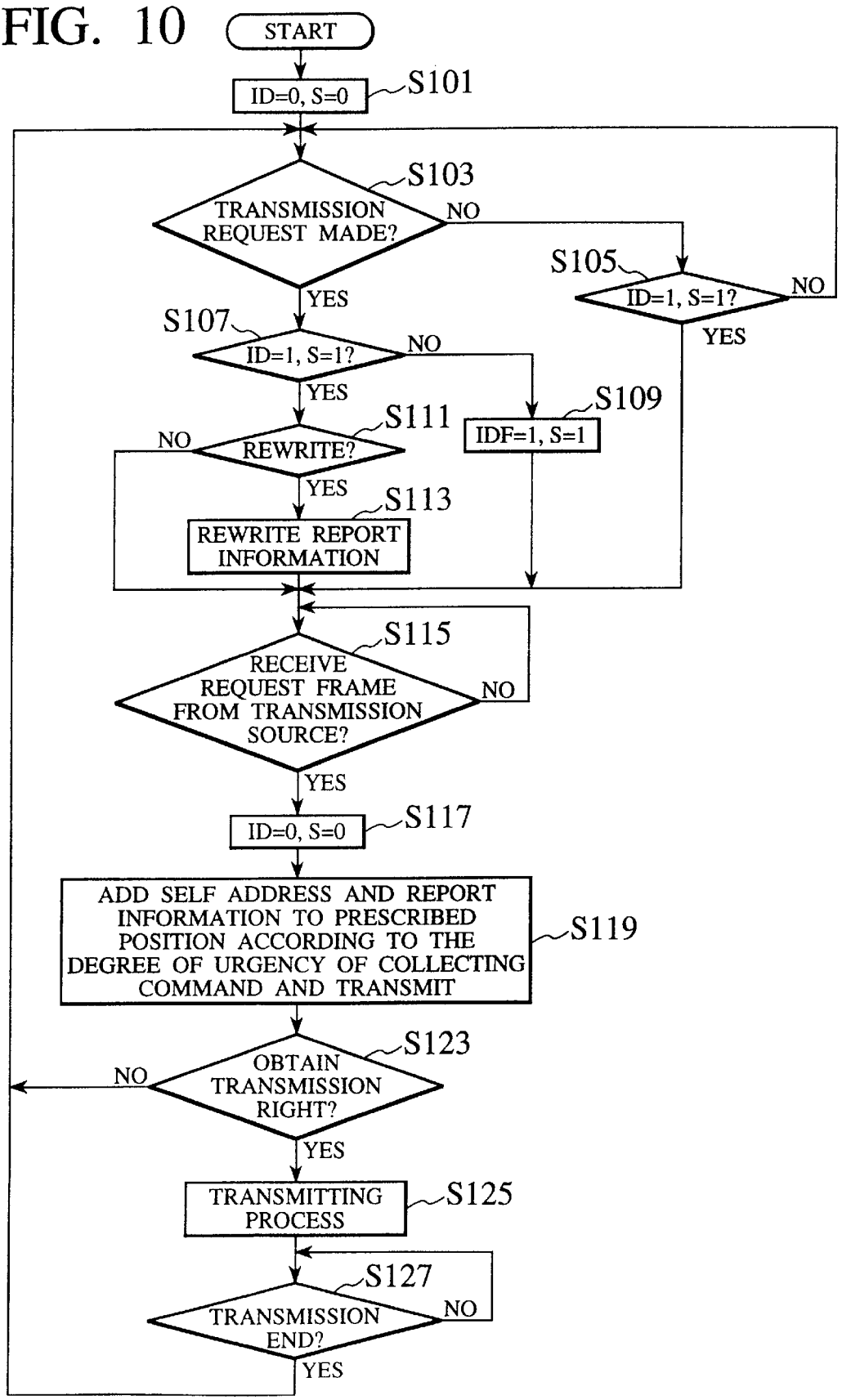
FIG. 10 is a flow chart showing the transmission rights managing method realized by the communication system according to the second embodiment.

FIG. 10 is a flow chart showing an operation of the communication system according to the second embodiment in the case where one communication device can make only one transmission request. The the first embodiment described the case where the respective communication devices make plural transmission requests simultaneously. The second embodiment describes the case where even when plural transmission requests exist, the transmission request in each communication device is limited to one. In this communication system, the transmission right arises in the SCU 4 at the time of starting the system.

First, the respective communication devices RH1 through RH5 reset the ID flag and S flag for "0" (S101), and judge as to whether or not a transmission request exists (S103). When a transmission request does not exist, a judgment is made as to whether or not the ID flag and S flag of the transmission memory 32 are "1" (S105), and when the ID flag and S flag are not "1", the sequence goes back to S103. When the ID flag and S flag are "1", the sequence goes to S115.

Meanwhile, when a transmission request exists at S103, a judgment is made as to whether or not the ID flag and S flag of the transmission memory 32 are "1" (S107), and when the ID flag and S flag are not "1", the ID flag and S flag are set for "1" (S109) and the sequence goes to S115.

In addition, when the ID flag and S flag are "1", a judgment is made as to whether or not report information is rewritten (S113). For example, in the case where previous report information is canceled or the report information has higher degree of urgency, the report information is rewritten.

Next, when the SCU as the transmission source transmits a request frame to the communication device in which the ID flag and S flag are set, TV of the communication device RH1 judges as to whether or not the communication device RH1 receives the request frame from the transmission source (S115).

Here, when the communication device RH1 receives the request frame, in the case where the ID flag and S flag is "1", it sets the ID flag and S flag for "0" (S117).

The communication device RH1 adds report information and self address of the communication device RH1 or of the functional equipment connected therewith to a prescribed position according to the degree of urgency of the collecting command and transmits the request frame to the communication device RH2 (S119). In this case, if the degree of urgency of the command of the TV in the communication device RH1 is "0", for example, a command including the self address and report information of the TV is added to the first position in the degree of urgency 0 of the collecting command shown in FIG. 8.

Next, when the ID flag and S flag were set for "1", the communication device RH2 receives a request frame where the report information of the TV of the communication device RH1 has been collected. Also in the communication device RH2, the process of the flow chart shown in FIG. 2 is performed.

The communication device RH2 where the S flag and ID flag are set adds report information and self address to the information area according to the degree of urgency of the command in the request frame, and transmits the request frame to the communication device RH3. In this case, if the degree of urgency of the command in the DVD-ROM of the communication device RH2 is "2", for example, the self address and command of the DVD-ROM are added to the first position in the degree of urgency 2 of the collecting command shown in FIG. 8.

The request frame is transmitted to the communication devices RH3, RH4 . . . in this order in the same manner, and in the respective communication devices, the report information and self addresses are added to the information area according to the degree of urgency of the command in the request frame.

Thereafter, the SCU 4 as the transmission source collects the request frames to which the self addresses and report information of all the functional equipments where the ID flag and S flag are set, namely, of all the functional equipments making the transmission request are added collectively, and the request frames are returned to the transmission source.

The SCU 4 determines the functional equipment having the highest priority based on the degree of urgency stored in the request frames and time when the transmission request is made.

Here, as for the order of priority, the degree of urgency 2 is the highest, and when the degrees of urgency are equal, the functional equipment which generates the transmission request earlier has higher priority. The SCU 4 gives the transmission right and report information to the functional equipment having the highest priority. In this case, since the degree of urgency of the DVD-ROM of the communication device RH2 is "2", the answer frame is transmitted to the communication device RH2 and SCU 4.

The communication device RH2 judges as to whether or not the DVD-ROM obtains the transmission right (S123). The DVD-ROM of the communication device RH2 which obtained the transmission right starts transmission of the data (S125). Further, the communication device RH2 judges as to whether or not the transmission is completed (S127), and when the transmission is not completed, the sequence goes back to S103.

Next, the communication device RH2 collects the request frame including the report information from the functional equipment of the communication device where the ID flag and transmission flag are set.

In such a manner, when the functional equipments of the respective communication devices generate transmission request, the ID flag and S flag are set, the request frame is transmitted from the transmission source to the communication device where the ID flag and S flag are set, and in the communication device which received the request frame, the ID flag and S flag of the information memory 33 are reset, and the request frame to which the self address and report information are added is transmitted.

Namely, by collecting all pieces of report information of the functional equipments having transmission request successively, the report information can be collected at small communication traffic amount without conflict of data.

In addition, in the request frame, an area, to which report information is previously added according to the degree of urgency of the report information, is predetermined, and in the functional equipment having transmission request, the self address and report information are added to a prescribed position of the collecting command according to the degree of urgency.

For this reason, in the transmission source, it is not necessary to rearrange the information about the order of priority, so the order of priority of transmission right is determined according to the degree of urgency very easily, and the transmission right can be given to the functional equipment having the highest priority. As a result, compared with the communication system in the first embodiment, this communication system can cope with an emergency. Moreover, when a transmission source collects the request frame and the SCU 4 collects an answer frame, the path management becomes simple.

Here, as for the collecting command, the description was given as to the case where three types of them, the degrees of urgency 2, 1 and 0 are collected, but the present invention is not limited to this, so the present invention is applicable to the arrangement that two types, the degrees of urgency 2 and 1 are collected, or only one type, the degree of urgency 2, is collected.

What is claimed is:

1. A transmission right managing method in which communication is performed between plural communication devices connected with a data transmission line and a transmission right communication device with a transmission right in the plural communication devices transmits data to one or more transmission requesting communication devices which request the transmission right in remaining communication devices, said method comprising the steps of:

transmitting a collecting command from the transmission right communication to the transmission request communication devices;

adding self addresses to the collecting command in the transmission requesting communication devices, when a transmission request is made, to transmit the collecting command from the transmission requesting communication devices; and receiving in the transmission right communication device the collecting command to which self addresses of all the transmission requesting communication devices making the transmission request were added collectively.

2. The transmission right managing method according to claim 1, comprising the additional steps of:

setting transmission flags, when the transmission request is made, in the transmission requesting communication devices; and receiving the collecting command in only the transmission requesting communication devices which set the transmission flags.

3. The transmission right managing method according to claim 1, wherein report information representing the degree of urgency of a command for one or more transmission requesting functional equipments connected with the transmission requesting communication devices making the transmission request is added to the collecting command.

4. The transmission right managing method according to claim 3, wherein the transmission right communication device determines the transmission requesting functional equipments to which the transmission right should be given, based on the degree of urgency of the command and priority of the self addresses of the transmission requesting functional equipments.

5. The transmission right managing method according to claim 1, wherein the self addresses are added to the collecting command in an area which is divided per the degree of urgency of the command.

6. The transmission right managing method according to claim 1, wherein requesting contents for the transmission requesting communication devices making the transmission request are added to the collecting command.

7. The transmission right managing method according to claim 1, wherein the transmission right communication device determines the transmission requesting communication devices to which the transmission right should be given, based on the collected address.

8. The transmission right managing method according to claim 1, wherein the transmission right communication device determines the transmission requesting functional devices to which the transmission right should be given connected with the transmission requesting communication devices, based on the collected addresses.

9. The transmission right managing method according to claim 1, wherein the transmission requesting communication devices add adding information to the received and collecting command successively in a prescribed arrangement.

10. The transmission right managing method according to claim 1, wherein the adding information collected by the transmission right communication device is transmitted to a managing device for managing a path of a communication system.

11. A communication system comprising plural communication devices connected with a data transmission line, in which communication is performed between the plural communication devices, and a communication device with transmission right in the plural communication devices transmits data to one or more transmission requesting communication devices requesting transmission right in the remaining communication devices, wherein:

the transmission right communication device transmits a collecting command to the transmission requesting communication devices, when a transmission request is made, the transmission requesting communication devices add its self addresses to the collecting command so as to transmit the collecting command, the transmission right communication device receives the collecting command to which self addresses of all the transmission requesting communication devices making the transmission request were added collectively.

12. The communication system according to claim 11, wherein:

when the transmission request is made, the transmission requesting communication devices set transmission flags, only the transmission requesting communication devices which set the transmission flags receive the collecting command.

13. The communication system according to claim 11, wherein report information representing the degree of urgency of a command for one or more transmission requesting functional equipments connected with the transmission requesting communication devices making the transmission request is added to the collecting command.

14. The communication system according to claim 13, wherein the transmission right communication device determines the transmission requesting functional equipments to which the transmission right should be given, based on the degree of urgency of the command and priority of the self addresses of the transmission requesting functional equipments.

15. The communication system according to claim 11, wherein the self addresses are added to the collecting command in an area which is divided per the degree of urgency of the command.

16. The communication system according to claim 11, wherein requesting contents for the transmission requesting communication devices making the transmission request are added to the collecting command.

17. The communication system according to claim 11, wherein the transmission right communication device determines the transmission requesting communication devices to which the transmission right should be given, based on the collected address.

18. The communication system according to claim 11, wherein the transmission right communication device determines the transmission requesting functional devices to which the transmission right should be given connected with the transmission requesting communication devices, based on the collected addresses.

19. The communication system according to claim 11, wherein the transmission requesting communication devices add adding information to the received collecting command successively in a prescribed arrangement.

20. The communication system according to claim 11, wherein the adding information collected by the transmission right communication device is transmitted to a managing device for managing a path of a communication system.

* * * * *